United States Patent
Nakagoshi

(10) Patent No.: US 12,248,542 B2
(45) Date of Patent: Mar. 11, 2025

(54) IMAGE FORMING APPARATUS THAT MANAGES APPLICATION ACCESSIBLE BY USER, INFORMATION PROCESSING SYSTEM INCLUDING IMAGE FORMING APPARATUS, AUTHENTICATION APPLICATION PROGRAM, AND NORMAL APPLICATION PROGRAM

(71) Applicant: KYOCERA Document Solutions Inc., Osaka (JP)

(72) Inventor: Yumi Nakagoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 360 days.

(21) Appl. No.: 17/731,177

(22) Filed: Apr. 27, 2022

(65) Prior Publication Data

US 2022/0366023 A1   Nov. 17, 2022

(30) Foreign Application Priority Data

May 14, 2021   (JP) ................................. 2021-082258

(51) Int. Cl.
  *G06F 21/31*   (2013.01)
(52) U.S. Cl.
  CPC .................... *G06F 21/31* (2013.01)
(58) Field of Classification Search
  CPC ....................................................... G06F 21/31
  See application file for complete search history.

(56) References Cited

U.S. PATENT DOCUMENTS

| | | | | |
|---|---|---|---|---|
| 2004/0117665 A1* | 6/2004 | Ong | .................. | G06F 21/46 726/4 |
| 2009/0133104 A1* | 5/2009 | Iwamoto | ................ | G06F 21/604 726/4 |
| 2014/0082747 A1* | 3/2014 | Negoro | ................... | G06F 21/31 726/28 |
| 2018/0082270 A1* | 3/2018 | Sun | ...................... | G06Q 20/108 |
| 2019/0245874 A1* | 8/2019 | Balasubramanian | ... | G06F 21/10 |
| 2022/0366023 A1* | 11/2022 | Nakagoshi | ............. | G06F 21/31 |

FOREIGN PATENT DOCUMENTS

JP   2014059673 A   4/2014

* cited by examiner

*Primary Examiner* — Ponnoreay Pich
(74) *Attorney, Agent, or Firm* — IP Business Solutions, LLC.

(57) ABSTRACT

An image forming apparatus includes an authentication application device that registers information acquired from an authentication system, and indicating a normal application accessible by a user when the user logs in in the image forming apparatus, in temporary user information, and a normal application device that decides, upon being requested to activate itself, whether the user who has logged in in the image forming apparatus is authorized to utilize the normal application device, on a basis of the temporary user information.

3 Claims, 21 Drawing Sheets

| GROUP NAME | ACCESSIBLE APPLICATION INFORMATION |
|---|---|
| GROUP1 | ADDRESS LIST PRINT APPLICATION |
| GROUP2 | ADDRESS LIST PRINT APPLICATION<br>CLOUD-LINKED APPLICATION |
| GROUP3 | CLOUD-LINKED APPLICATION |
| ⁎ | ⁎ ⁎ ⁎ |

34d GROUP INFORMATION DATABASE

227d REGULAR USER INFORMATION DATABASE

| USER ID | PASSWORD | USER NAME | ACCESSIBLE APPLICATION INFORMATION |
|---|---|---|---|
| 9001 | Ad0$ | HANAKO KYOTO | ADDRESS LIST PRINT APPLICATION CLOUD-LINKED APPLICATION |
| 9002 | Be1% | TARO TOKYO | ADDRESS LIST PRINT APPLICATION |
| 9003 | cf2& | JIRO CHIYODA | ADDRESS LIST PRINT APPLICATION |
| ... | ... | ... | ... |

IMAGE FORMING APPARATUS THAT MANAGES APPLICATION ACCESSIBLE BY USER, INFORMATION PROCESSING SYSTEM INCLUDING IMAGE FORMING APPARATUS, AUTHENTICATION APPLICATION PROGRAM, AND NORMAL APPLICATION PROGRAM

INCORPORATION BY REFERENCE

This application claims priority to Japanese Patent Application No. 2021-082258 filed on May 14, 2021, the entire contents of which are incorporated by reference herein.

BACKGROUND

The present disclosure relates to an electronic device that manages applications accessible by a user, an information processing system including the electronic device, an authentication application program, and a normal application program.

Some of existing electronic devices are configured to decide, with respect to each of users, whether the user is authorized to utilize an application. Such an electronic device utilizes a program independent from an application program for realizing the applications, to realize the function to identify the application accessible by the user.

SUMMARY

The disclosure proposes further improvement of the foregoing techniques. In an aspect, the disclosure provides an electronic device including a control device. The control device includes a processor, and acts as an authentication application device that controls authentication of a user, when the processor executes an authentication application program, and as a normal application device, independent from the authentication application device, when the processor executes a normal application program. Further, the authentication application device acquires information indicating the normal application device accessible by the user, with respect to each of a plurality of users, when the user logs in in the electronic device, and registers information, generated on a basis of the acquired information, and indicating the normal application device accessible by the user who logs in in the electronic device, in logged-in user information as information indicating the user who has logged in in the electronic device. The normal application device decides, upon being requested to activate itself, whether the user who has logged in in the electronic device is authorized to utilize the normal application device, on a basis of the logged-in user information.

DETAILED DESCRIPTION

Hereafter, an electronic device according to an embodiment of an aspect of the disclosure, an information processing system including the electronic device, an authentication application program, and a normal application program will be described, with reference to the drawings.

First Embodiment

First, a configuration of the information processing system according to this embodiment will be described.

Figure 1:
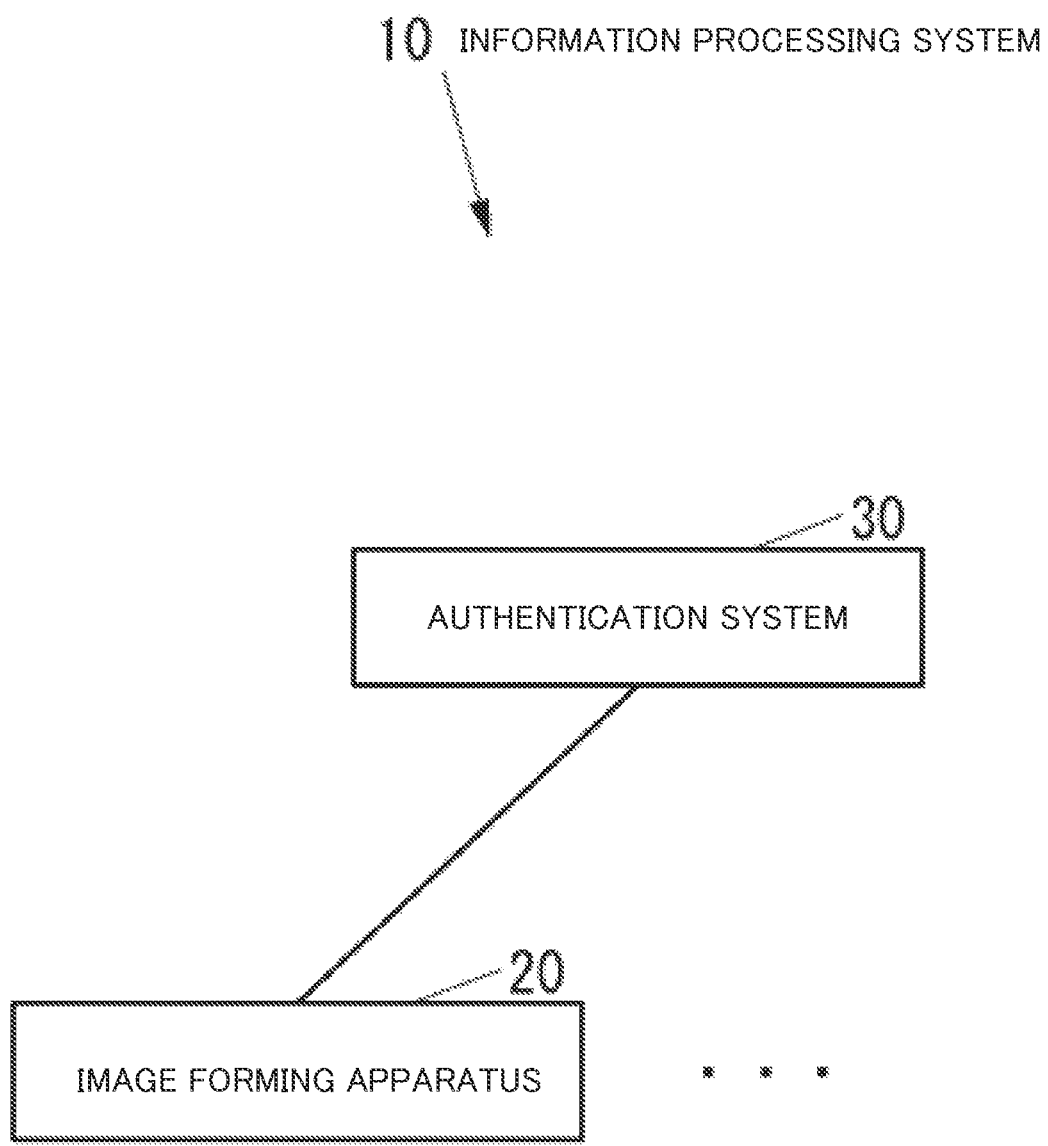
FIG. 1 is a block diagram showing a configuration of an information processing system according to a first embodiment of the disclosure.

FIG. 1 is a block diagram showing a configuration of an information processing system 10 according to this embodiment.

As shown in FIG. 1, the information processing system 10 includes an image forming apparatus 20, exemplifying the electronic device. The information processing system 10 may include one or more image forming apparatuses, configured similarly to the image forming apparatus 20, in addition thereto. The image forming apparatus in the information processing system 10 is, for example, constituted as a multifunction peripheral (MFP), or a single-function printer.

The information processing system 10 further includes an authentication system 30 provided outside of the image forming apparatus, for the purpose of authentication of the user of the image forming apparatus in the information processing system 10. The authentication system 30 may be constituted of a single computer, or a plurality of computers.

In the information processing system 10, the image forming apparatus and the authentication system 30 can communicate with each other via a network such as a local area network (LAN) or the internet, or directly by wired or wireless communication, without utilizing the network.

Figure 2:
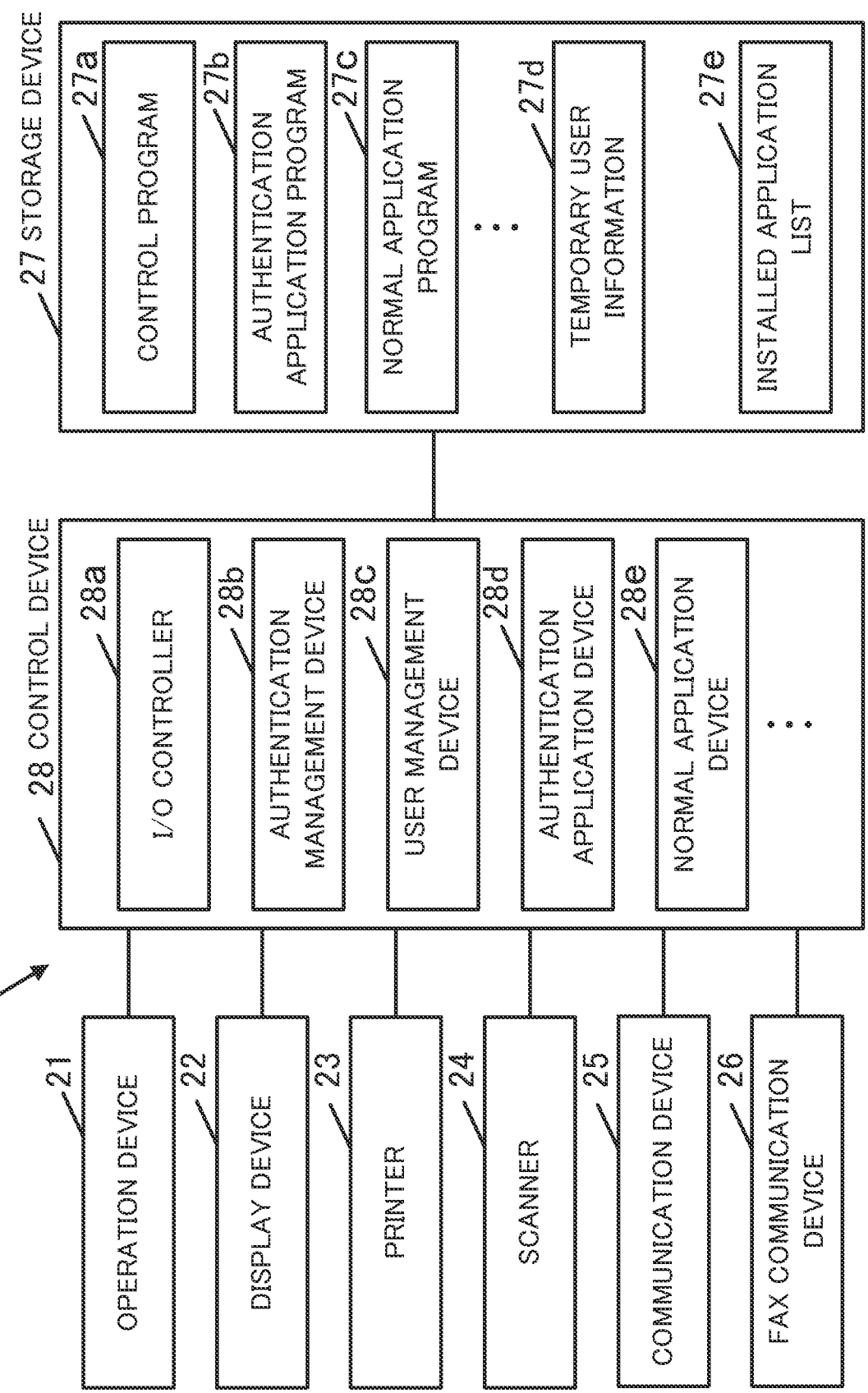
FIG. 2 is a block diagram showing a configuration of the image forming apparatus in FIG. 1, constituted as an MFP.

FIG. 2 is a block diagram showing a configuration of the image forming apparatus 20, constituted as an MFP;

As shown in FIG. 2, the image forming apparatus 20 includes an operation device 21 including, for example, buttons and an integrated circuit (IC) card reader, through which various operations are inputted, a display device 22, for example constituted of a liquid crystal display (LCD), for displaying various types of information, a printer 23 that prints an image on a recording medium such as a recording sheet, a scanner 24 that reads an image from a source document, a communication device 25 that makes communication with an external device via a network such as LAN or the internet, or directly by wired or wireless communication, without utilizing the network, a facsimile (fax) communication device 26 that makes fax communication with a non-illustrated external fax machine via a communication circuit such as the public telephone network, a storage device 27 which is a non-volatile storage medium such as a semiconductor memory and a hard disk drive (HDD), for storing various types of information, and a control device 28 that controls the overall operation of the image forming apparatus 20.

The storage device 27 contains a control program 27a for controlling the image forming apparatus 20. The control program 27a may be, for example, installed in the image forming apparatus 20 during the manufacturing process thereof, additionally installed in the image forming apparatus 20 from an external storage medium such as a compact disk (CD), a digital versatile disk (DVD), or a universal serial bus (USB) memory, or additionally downloaded into the image forming apparatus 20 from the network.

The storage device 27 contains an authentication application program 27b, for realizing an authentication application device 28d to be subsequently described, which serves to control the authentication of the user. The authentication application program 27b may be, for example, installed in the image forming apparatus 20 during the manufacturing process thereof, additionally installed in the image forming apparatus 20 from an external storage medium such as a compact disk (CD), a digital versatile disk (DVD), or a USB memory, or additionally downloaded into the image forming apparatus 20 from the network. When a processor included in the control device 28 operates according to the authentication application program 27b, the control device 28 acts as the authentication application device.

The storage device 27 can contain a normal application program 27c for realizing a normal application device, which is an application device independent from the authentication application device 28d. The storage device 27 may also contain at least one normal application program, in addition to the normal application program 27c. The normal application program may be, for example, installed in the image forming apparatus 20 during the manufacturing process thereof, additionally installed in the image forming apparatus 20 from an external storage medium such as a compact disk (CD), a digital versatile disk (DVD), or a USB memory, or additionally downloaded into the image forming apparatus 20 from the network. When the processor included in the control device 28 operates according to the normal application program 27b, the control device 28 acts as the normal application device.

Regarding the normal application device, when various types of the normal application programs 27c are installed in the storage device 27, the application devices respectively corresponding to those normal application programs can be realized. For example, such normal application devices include an application device for printing a list of addresses stored in an address book managed by the image forming apparatus 20 (hereinafter, "address list print application device"), and an application device that realizes collaboration with an external system such as a cloud service (hereinafter, "cloud-linked application device"). The normal application devices may be created limitlessly.

The storage device 27 contains temporary user information 27d, including information of temporary users of the image forming apparatus 20. The temporary user information 27d constitutes logged-in user information, including the information of the user who has logged in in the image forming apparatus 20.

Figure 3:
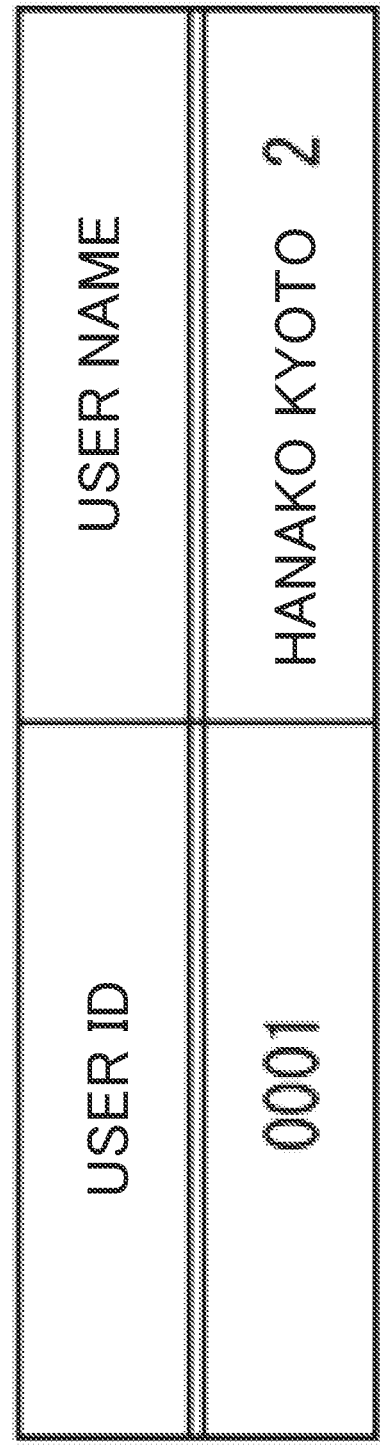
FIG. 3 is a schematic drawing showing an example of the temporary user information shown in FIG. 2.

FIG. 3 illustrates an example of the temporary user information 27d.

As shown in FIG. 3, the temporary user information 27d includes a user ID, which is the identification information of the user, and the user's name.

As shown in FIG. 2, the storage device 27 contains an installed application list 27e including the normal application programs that have been installed in the image forming apparatus 20 (hereinafter, simply "application", or "normal application").

Figure 4:
FIG. 4 is a schematic drawing showing an example of the installed application list shown in FIG. 2.

FIG. 4 illustrates an example of the installed application list 27e.

As shown in FIG. 4, the installed application list 27e includes an application ID, which is the identification information of the application, and the application name, with respect to each of the applications. Here, the application ID is newly given to the application, each time the image forming apparatus 20 is activated. Accordingly, the application ID of the same application may vary, each time the image forming apparatus 20 is activated.

The control device 28 shown in FIG. 2 includes, for example, a central processing unit (CPU) exemplifying the processor, a read-only memory (ROM) containing the programs and various types of data, and a random-access memory (RAM) that serves as the operational region for the CPU. The CPU executes the programs stored in the storage device 27 or the ROM.

The control device 28 realizes, by executing the control program 27a stored in the storage device 27, an input/output (I/O) controller 28a that controls inputs from the operation device 21 and outputs to the display device 22, an authentication management device 28b that controls the user authentication, and a user management device 28c that manages the user.

The control device 28 realizes the authentication application device 28d, by executing the authentication application program 27b stored in the storage device 27.

The control device 28 realizes, by executing the normal application program stored in the storage device 27, a normal application device 28e that executes an operation defined by the normal application program. For example, when the processor included in the control device 28 operates according to the normal application program 27c stored in the storage device 27, the control device 28 acts as the normal application device 28e.

Figure 5:
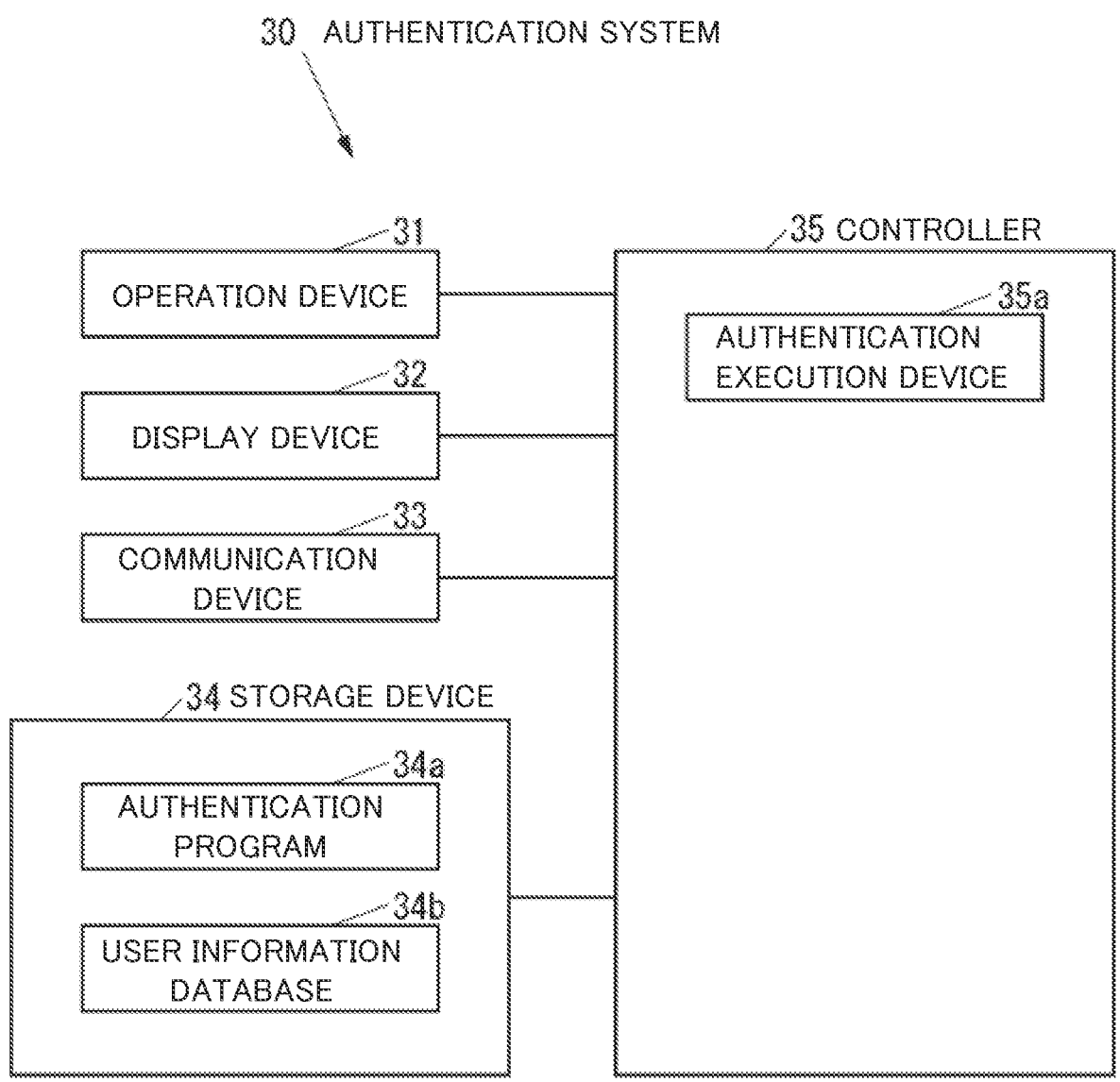
FIG. 5 is a block diagram showing a configuration of the authentication system shown in FIG. 1, realized by one computer.

FIG. 5 is a block diagram showing a configuration of the authentication system 30, realized by one computer.

As shown in FIG. 5, the authentication system 30 includes an operation device 31, for example including buttons for inputting various operations, a display device 32, for example constituted of a liquid crystal display (LCD), for displaying various types of information, a communication device 33 that makes communication with an external device via a network such as LAN or the internet, or directly by wired or wireless communication, without utilizing the network, a storage device 34 which is a non-volatile storage medium such as a semiconductor memory and a HDD, for storing various types of information, and a controller 35 that controls the overall operation of the authentication system 30.

The storage device 34 contains an authentication program 34a for authenticating the user who utilizes the image forming apparatus. The authentication program 34a may be, for example, installed in the authentication system 30 during the manufacturing process thereof, additionally installed in the authentication system 30 from an external storage medium such as a compact disk (CD), a digital versatile disk (DVD), or a USB memory, or additionally downloaded into the authentication system 30 from the network.

The storage device 34 contains a user information database 34b, including the information of the users of the image forming apparatus.

Figure 6:
FIG. 6 is a schematic drawing showing an example of the user information database shown in FIG. 5.

FIG. 6 illustrates an example of the user information database 34b.

As shown in FIG. 6, the user information database 34b includes the user ID, the password of the user, the user name, and accessible application information indicating the normal application that the user is authorized to utilize, with respect to each of the users. Accordingly, the authentication system 30 serves as a user information management device that manages the information about the normal application accessible by the user, with respect to each of the users.

The controller 35 shown in FIG. 5 includes, for example, a CPU, a ROM containing the programs and various types of data, and a RAM that serves as the operational region for the CPU. The CPU executes the programs stored in the storage device 34 or the ROM.

The controller 35 realizes an authentication execution device 35a that executes the authentication of the user, by executing the authentication program 34a stored in the storage device 34. The authentication execution device 35a can update the user information database 34b, for example according to an instruction received through the operation device 31 or the communication device 33.

Hereunder, an operation of the information processing system 10 will be described.

First, an operation performed by the image forming apparatus 20, when the user logs in, will be described.

Figure 7:
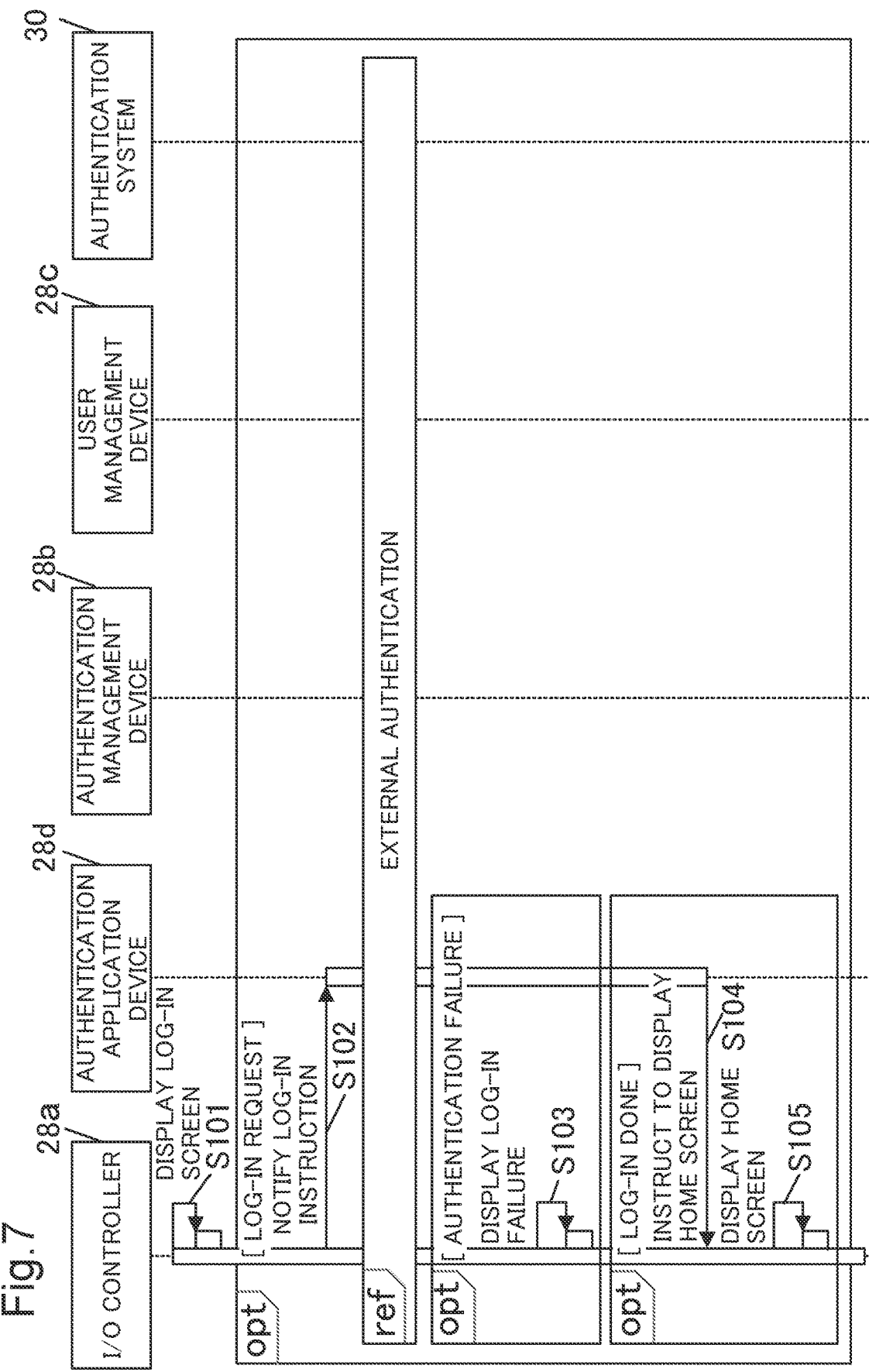
FIG. 7 is a sequence diagram showing an operation performed by the image forming apparatus shown in FIG. 2, when a user logs in in the image forming apparatus.
Figure 8:
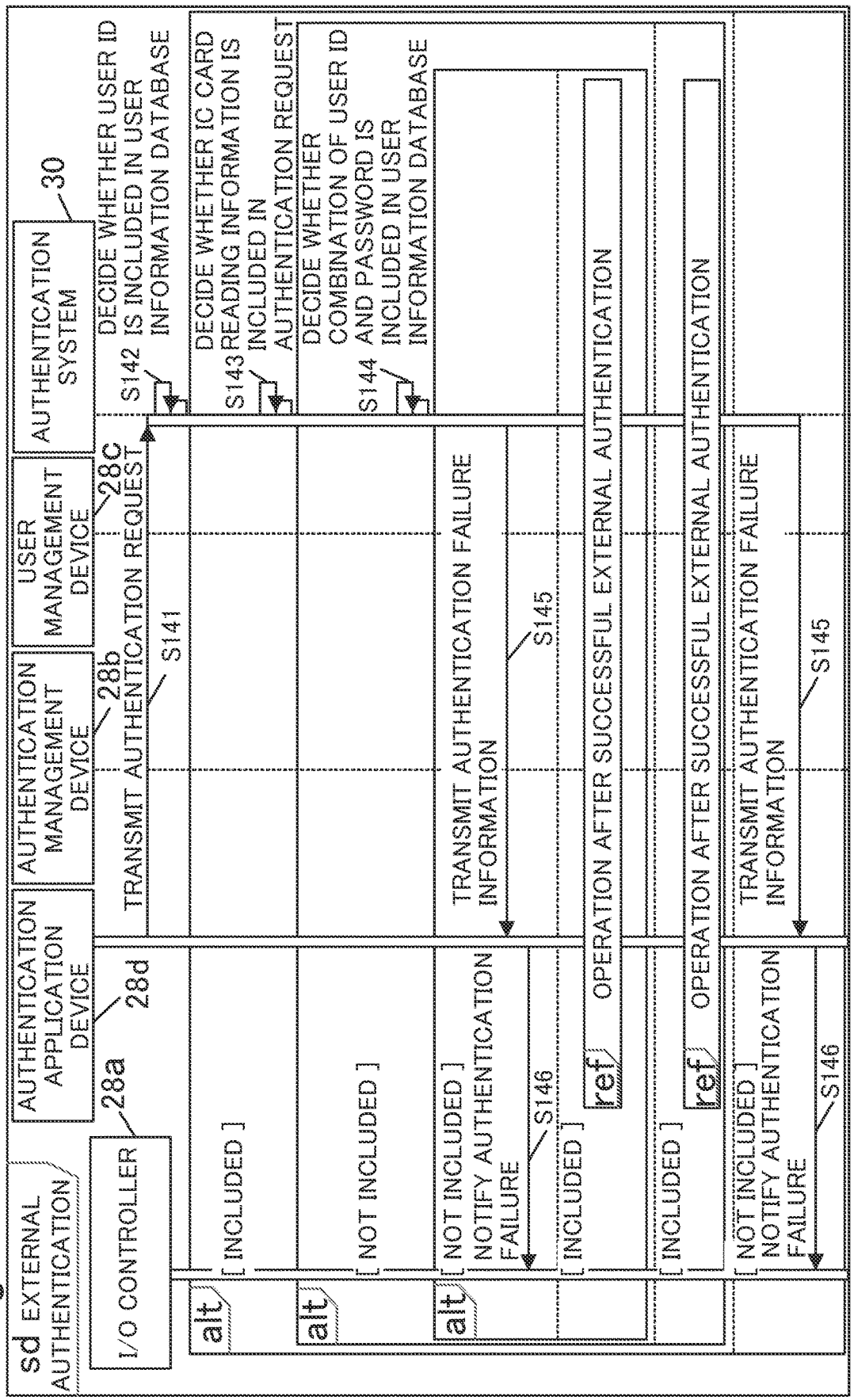
FIG. 8 is a sequence diagram showing a process of the external authentication shown in FIG. 7.
Figure 9:
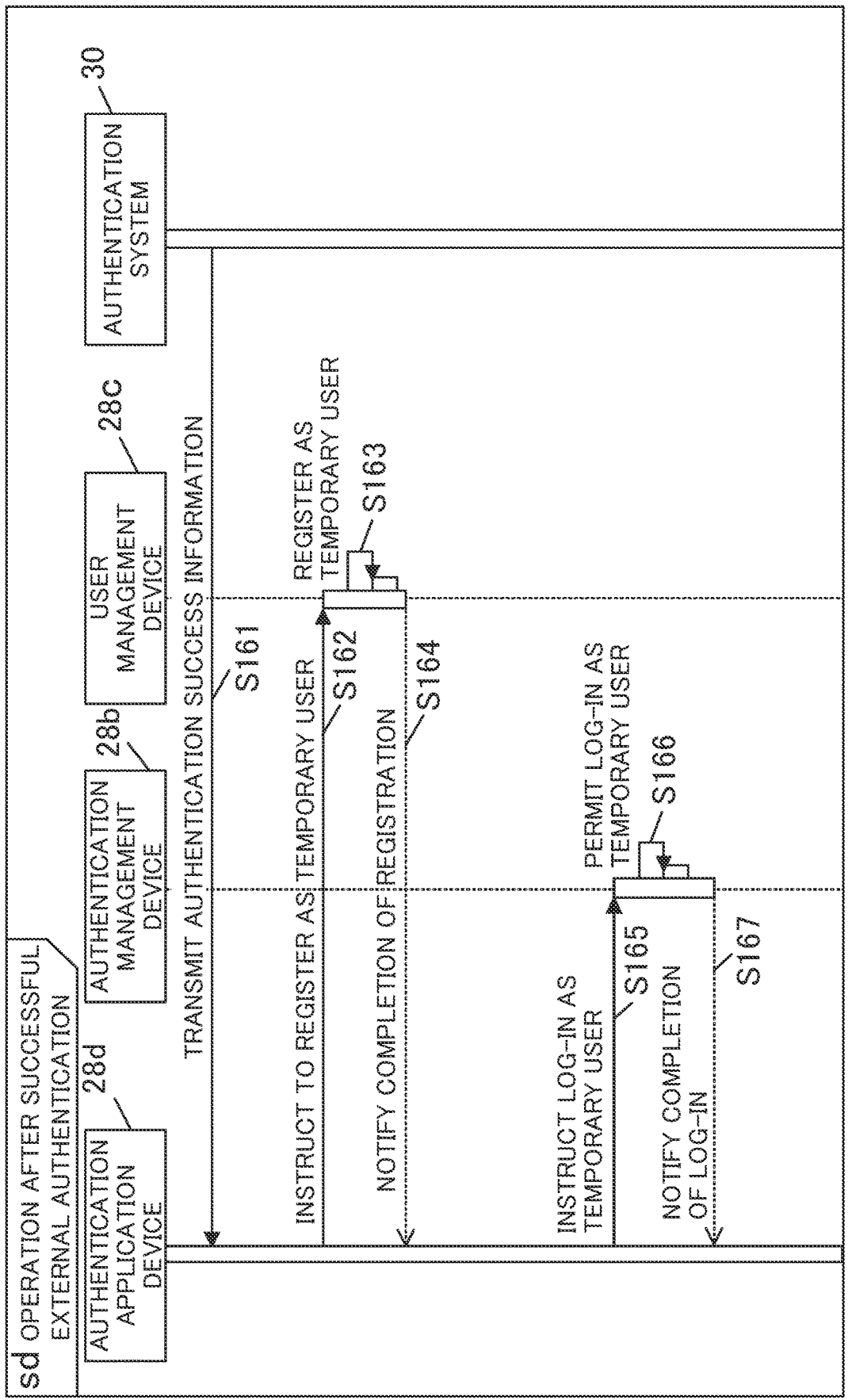
FIG. 9 is a sequence diagram showing an operation performed when the external authentication shown in FIG. 8 is successful.
Figure 10:
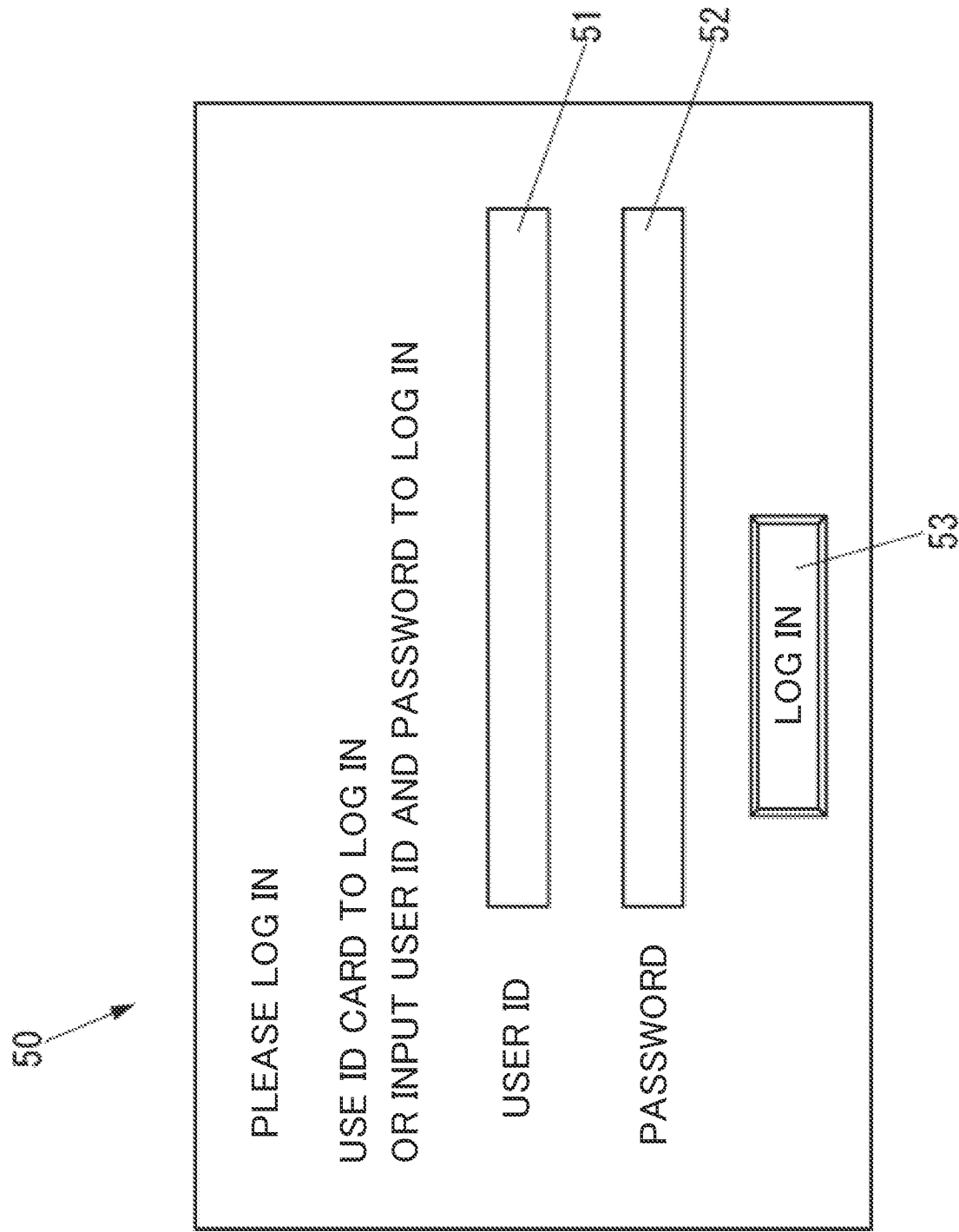
FIG. 10 is a schematic drawing showing an example of a log-in screen, for the user to log in in the image forming apparatus shown in FIG. 2.

FIG. 7 is a sequence diagram showing the operation performed by the image forming apparatus 20, when the user logs in therein. FIG. 8 is a sequence diagram showing a process of the external authentication shown in FIG. 7. FIG. 9 is a sequence diagram showing an operation performed when the external authentication shown in FIG. 8 is successful. FIG. 10 illustrates an example of a log-in screen 50, for the user to log in in the image forming apparatus 20.

As shown in FIG. 7 to FIG. 9, the I/O controller 28a of the image forming apparatus 20 displays the log-in screen 50 (see FIG. 10) on the display device 22 (S101).

The log-in screen 50 shown in FIG. 10 includes a text box 51 for inputting the user ID of the user about to log in in the image forming apparatus 20, a text box 52 for inputting the password of the user about to log in in the image forming apparatus 20, and a button 53 for the user to log in in the image forming apparatus 20.

Here, the log-in screen 50 does not include buttons for utilizing the functions originally installed in the image forming apparatus 20, such as "copy", "transmit", "fax", "user box", "job box", and "USB drive", which will be subsequently described, and a button for utilizing the normal application. Therefore, while the log-in screen 50 is displayed on the display device 22, the user of the image forming apparatus 20 is unable to utilize the functions originally installed in the image forming apparatus 20, and the normal application.

As shown in FIG. 7 to FIG. 9, upon detecting a request for logging in in the image forming apparatus 20 (hereinafter, "log-in request") after S101, the I/O controller 28a notifies the instruction to log in in the image forming apparatus 20 (hereinafter, "log-in instruction"), to the authentication application device 28d (S102). At this point, the I/O controller 28a may detect the log-in request, when the IC card reader of the operation device 21 has read the user ID from the IC card, or from the press of the button 53 detected through the operation device 21. In the case of detecting the log-in request when the IC card reader has read the user ID from the IC card, the I/O controller 28a includes the combination of the user ID read by the IC card reader from the IC card, and information indicating that the user ID has been read from the IC card (hereinafter, "IC card reading information"), in the log-in instruction. In the case of detecting the log-in request, from the press of the button 53 detected through the operation device 21, the I/O controller 28a includes the combination of the user ID and the password, respectively inputted in the text boxes 51 and 52 by the time that the press of the button 53 is detected by the operation device 21, in the log-in instruction.

Upon receipt of the log-in instruction from the I/O controller 28a at S102, the authentication application device 28d transmits the request for authentication from the user (hereinafter, "authentication request") to the authentication system 30 (S141). In this case, when the combination of the user ID and the IC card reading information is included in the log-in instruction, the authentication application device 28d includes such combination in the authentication request. When the combination of the user ID and the password is included in the log-in instruction, the authentication application device 28d includes such combination in the authentication request.

The authentication execution device 35a of the authentication system 30 decides, upon receipt of the authentication request transmitted from the authentication application device 28d at S141, whether the user ID included in the authentication request is included in the user information database 34b (S142).

Upon deciding at S142 that the user ID included in the authentication request is included in the user information database 34b, the authentication execution device 35a decides whether the authentication request includes the IC card reading information (S143).

Upon deciding at S143 that the IC card reading information is not included in the authentication request, the authentication execution device 35a decides whether the combination of the user ID and the password included in the authentication request is included in the user information database 34*b* (S144).

Upon deciding at S142 that the user ID included in the authentication request is not included in the user information database 34*b*, or upon deciding at S144 that the combination of the user ID and the password included in the authentication request is not included in the user information database 34*b*, the authentication execution device 35*a* transmits information indicating the failure in authentication of the user (hereinafter, "authentication failure information") to the authentication application device 28*d* of the image forming apparatus 20 (S145).

The authentication application device 28*d* notifies, upon receipt of the authentication failure information transmitted from the authentication execution device 35*a* at S145, the failure of the user authentication to the I/O controller 28*a* (S146).

Upon receipt of the notice of the user authentication failure transmitted from the authentication application device 28*d* at S146, the I/O controller 28*a* displays the failure in logging in in the image forming apparatus 20, on the display device 22 (S103).

The authentication execution device 35*a* of the authentication system 30 transmits, upon deciding at S143 that the IC card reading information is included in the authentication request, or upon deciding at S144 that the combination of the user ID and the password in the authentication request is included in the user information database 34*b*, in other words upon deciding that the user authentication has resulted successful, the information indicating the success in user authentication (hereinafter, "authentication success information"), to the authentication application device 28*d* of the image forming apparatus 20 (S161). At this point, the authentication execution device 35*a* retrieves the ID and the name of the user who has been successfully authenticated, and the accessible application information from the user information database 34*b*, and includes the user ID, the user name, and the accessible application information that have been retrieved, in the authentication success information.

The authentication application device 28*d* instructs the user management device 28*c*, upon receipt of the authentication success information transmitted from the authentication execution device 35*a* at S161, to register the user who is the subject of the authentication success information, as a temporary user (S162). In this case, the authentication application device 28*d* includes the user ID included in the authentication success information transmitted from the authentication execution device 35*a* at S161, in the instruction of S162, as the user ID of the temporary user. In addition, the authentication application device 28*d* includes, as the name of the temporary user in the instruction of S162, the information including the combination of the user name included in the authentication success information transmitted from the authentication execution device 35*a* at S161, and the application ID associated in the installed application list 27*e* with the application name indicated by the accessible application information included in the authentication success information. For example, when the user name and the accessible application information, included in the authentication success information transmitted from the authentication execution device 35*a* at S161, are "Hanako Kyoto" and "address list print application" respectively, and when the application ID associated with the "address list print application" in the installed application list 27*e* is "2", the authentication application device 28*d* includes "Hanako Kyoto, 2" as the name of the temporary user, in the instruction of S162.

Upon receipt of the instruction of S162, the user management device 28*c* registers the user relevant to the instruction of S162 in the temporary user information 27*d* as a temporary user (S163), and notifies the authentication application device 28*d* that the registration of the temporary user has been completed (S164).

The authentication application device 28*d* instructs, upon receipt of the notice of S164, the authentication management device 28*b* to permit the log-in as temporary user (S165).

Upon receipt of the instruction of S165, the authentication management device 28*b* lets the user relevant to the instruction of S165 log in in the image forming apparatus 20 as temporary user (S166), and notifies the authentication application device 28*d* that the log-in has been completed (S167).

Figure 11:
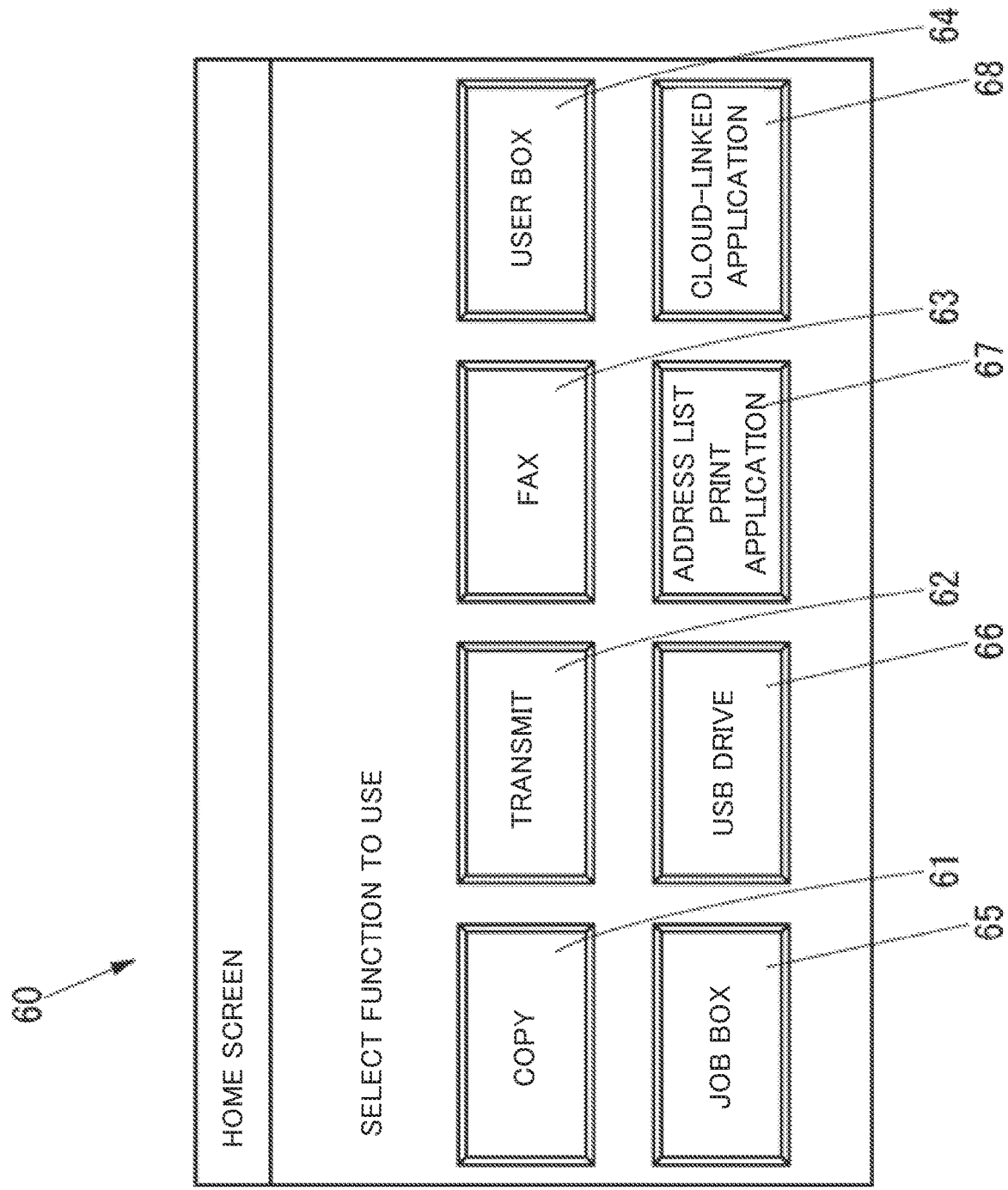
FIG. 11 is a schematic drawing showing an example of a home screen displayed by the operation shown in FIG. 7.

Upon receipt of the notice of S167, the authentication application device 28*d* instructs the I/O controller 28*a* to display a screen 60 serving as the base for the operation of the image forming apparatus 20 (hereinafter, "home screen"), as shown in FIG. 11 (S104).

FIG. 11 illustrates an example of the home screen 60.

The home screen 60 shown in FIG. 11 includes a button 61 for executing a "copy" function to print an image read by the scanner 24 from a source document on a recording medium with the printer 23, a button 62 for executing a "transmit" function to transmit, for example, the image read by the scanner 24 from the source document, with the communication device 25, a button 63 for executing a "fax" function to transmit, for example, the image read by the scanner 24 from the source document, with the facsimile communication device 26, a button 64 for executing a "user box" function to utilize a specific storage region prepared for each of the users in the storage device 27, for saving documents for various purposes such as printing, a button 65 for executing a "job box" function to utilize a specific storage region in the storage device 27, for saving the documents for various purposes such as private printing, a button 66 for executing a "USB drive" function to utilize the USB memory connected to the image forming apparatus 20, for saving the documents for various purposes such as printing, a button 67 for executing the "address list print application", and a button 68 for executing the "cloud-linked application".

Here, "copy", "transmit", "fax", "user box", "job box", and "USB drive" are the functions originally installed in the image forming apparatus 20.

The home screen 60 includes the buttons 61 to 66 for utilizing the functions originally installed in the image forming apparatus 20, and the buttons 67 and 68 for utilizing the normal application. Accordingly, when the home screen 60 is displayed on the display device 22, the user of the image forming apparatus 20 can instruct the image forming apparatus 20 to execute one of the functions originally installed therein, or one of the normal applications.

As shown in FIG. 7 to FIG. 9, the I/O controller 28*a* displays the home screen 60 on the display device 22, according to the instruction to display the home screen 60 made at S104 (S105).

Hereunder, the operation performed by the image forming apparatus 20 when activation of the normal application device, which operates according to the normal application (i.e., normal application program), is requested, will be described.

Figure 12:
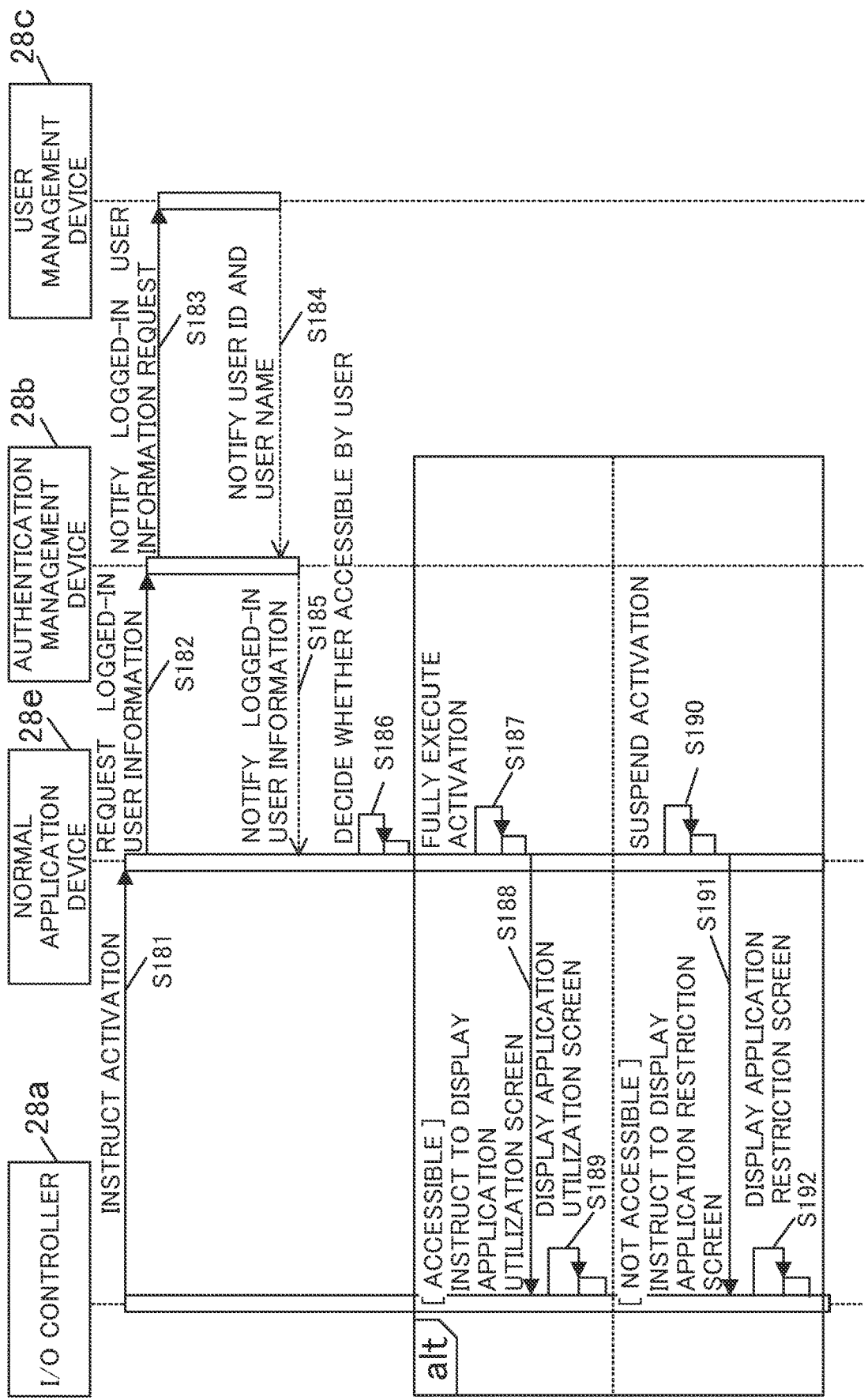
FIG. 12 is a sequence diagram showing an operation performed by the image forming apparatus shown in FIG. 2, when activation of a normal application is requested.

FIG. 12 is a sequence diagram showing the operation performed by the image forming apparatus 20, when activation of the normal application device is requested.

As shown in FIG. 12, upon detecting the request for activating the normal application device (hereinafter, "normal application device activation request"), the I/O controller 28a instructs the normal application device that is the subject of the normal application device activation request (hereinafter, simply "subject normal application device"), to activate itself (S181). In this case, the I/O controller 28a detects the normal application device activation request, when the button for utilizing the normal application on the home screen 60 is pressed through the operation device 21.

Upon receipt of the instruction of S181, the subject normal application device requests the authentication management device 28b to provide information of the user who has logged in in the image forming apparatus 20 (S182). At this point, the authentication management device 28b is aware of the user ID of the user who has logged in in the image forming apparatus 20, as the information of this user.

Upon receipt of the request of S182, the authentication management device 28b notifies the user management device 28c about the request for the information of the user who has logged in in the image forming apparatus 20 (hereinafter, "logged-in user information request") (S183). At this point, the authentication management device 28b includes the ID of the user who has logged in in the image forming apparatus 20, in the logged-in user information request.

Upon receipt of the notice of S183, the user management device 28c notifies the user ID included in the logged-in user information request, and the user name associated with the user ID in the temporary user information 27d, to the authentication management device 28b (S184).

When the information of the user who has logged in in the image forming apparatus 20 is notified at S184, the authentication management device 28b notifies the information received at S184 to the subject normal application device (S185).

Upon receipt of the notice of S185, the subject normal application device decides whether the user who has logged in in the image forming apparatus 20 is authorized to utilize the subject normal application device (S186). The subject normal application device decides at S186 that the user who has logged in in the image forming apparatus 20 is authorized to utilize the subject normal application device, when the application ID assigned to the normal application corresponding to the subject normal application device itself in the installed application list 27e is included in the user information in the notice of S185. On the other hand, the subject normal application device decides at S186 that the user who has logged in in the image forming apparatus 20 is not authorized to utilize the subject normal application device, when the application ID assigned to the normal application corresponding to the subject normal application device itself in the installed application list 27e is not included in the user information in the notice of S185. For example, in the case where the user name included in the notice of S185 is "Hanako Kyoto, 2", the subject normal application device decides at S186 that the user who has logged in in the image forming apparatus 20 is authorized to utilize the subject normal application device, when the subject normal application device is the normal application device corresponding to the address list print application, and the application ID assigned to the address list print application in the installed application list 27e is "2" as shown in FIG. 4. On the other hand, in the case where the user name included in the notice of S185 is "Hanako Kyoto, 2", the subject normal application device decides at S186 that the user who has logged in in the image forming apparatus 20 is not authorized to utilize the subject normal application device, when the subject normal application device is the normal application device corresponding to the cloud-linked application, and the application ID assigned to the cloud-linked application in the installed application list 27e is "3" as shown in FIG. 4.

Upon deciding at S186 that the user who has logged in in the image forming apparatus 20 is authorized to utilize the subject normal application device, the subject normal application device completely executes the activation of itself (S187), and instructs the I/O controller 28a to display a screen that allows the user to utilize the subject normal application device itself (hereinafter, "application utilization screen") (S188).

Upon being instructed to display the application utilization screen at S188, the I/O controller 28a displays the application utilization screen on the display device 22, according to the instruction of S188 (S189).

Figure 13:
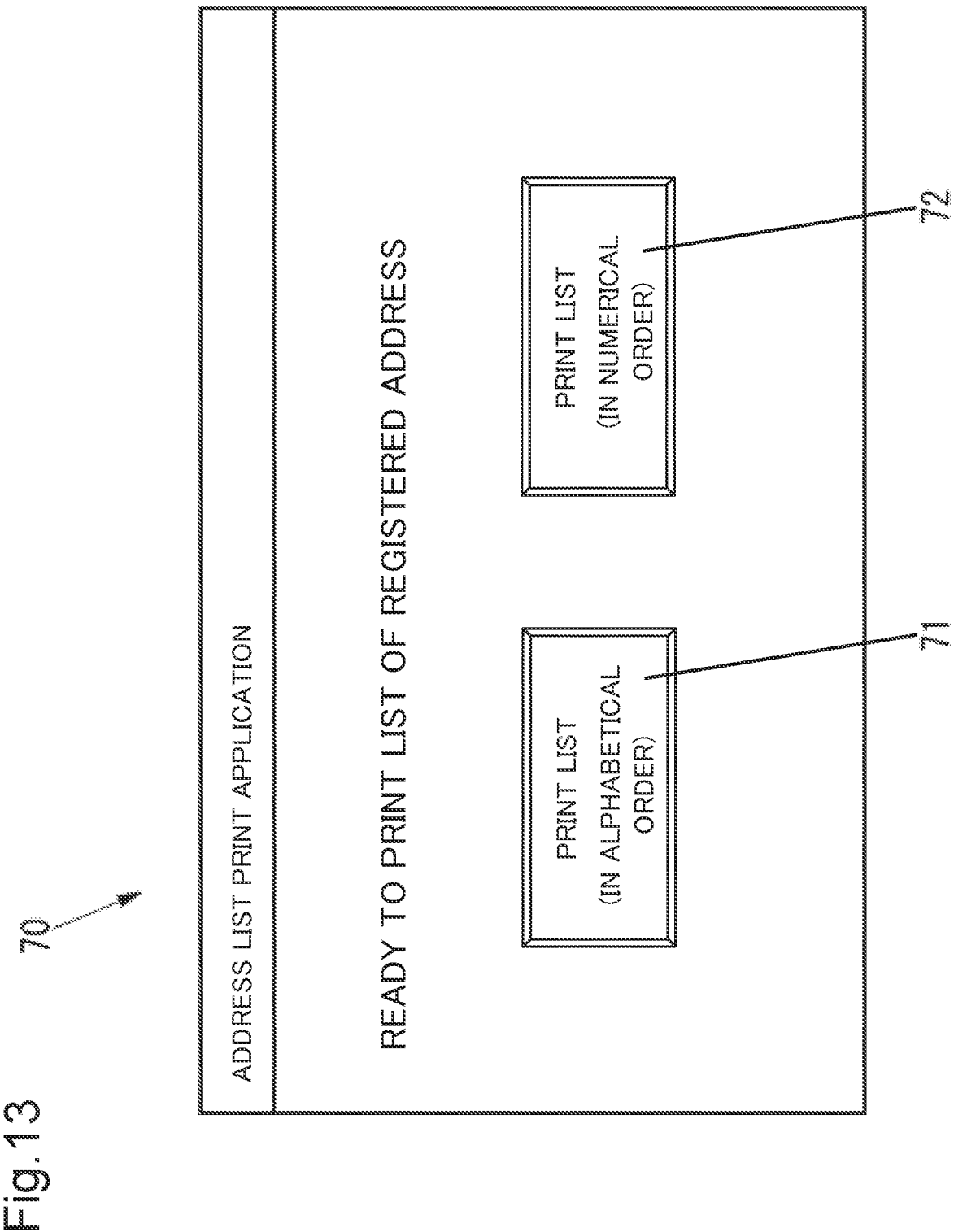
FIG. 13 is a schematic drawing showing an example of an application utilization screen, displayed by the operation shown in FIG. 12.

FIG. 13 illustrates an example of the application utilization screen 70.

The application utilization screen 70 shown in FIG. 13 represents the screen for utilizing the address list print application. The application utilization screen 70 shown in FIG. 13 includes a button 71 for printing the addresses stored in the address book in the alphabetical order of the address, and a button 72 for printing the addresses stored in the address book in the ascending order of the registration number of the address.

As shown in FIG. 12, upon deciding at S186 that the user who has logged in in the image forming apparatus 20 is not authorized to utilize the subject normal application device, the subject normal application device suspends the activation thereof (S190), and instructs the I/O controller 28a to display a screen for restricting the user from utilizing the subject normal application device (hereinafter, "application restriction screen") (S191).

Upon being instructed to display the application restriction screen at S191, the I/O controller 28a displays the application restriction screen on the display device 22, according to the instruction of S191 (S192).

Figure 14:
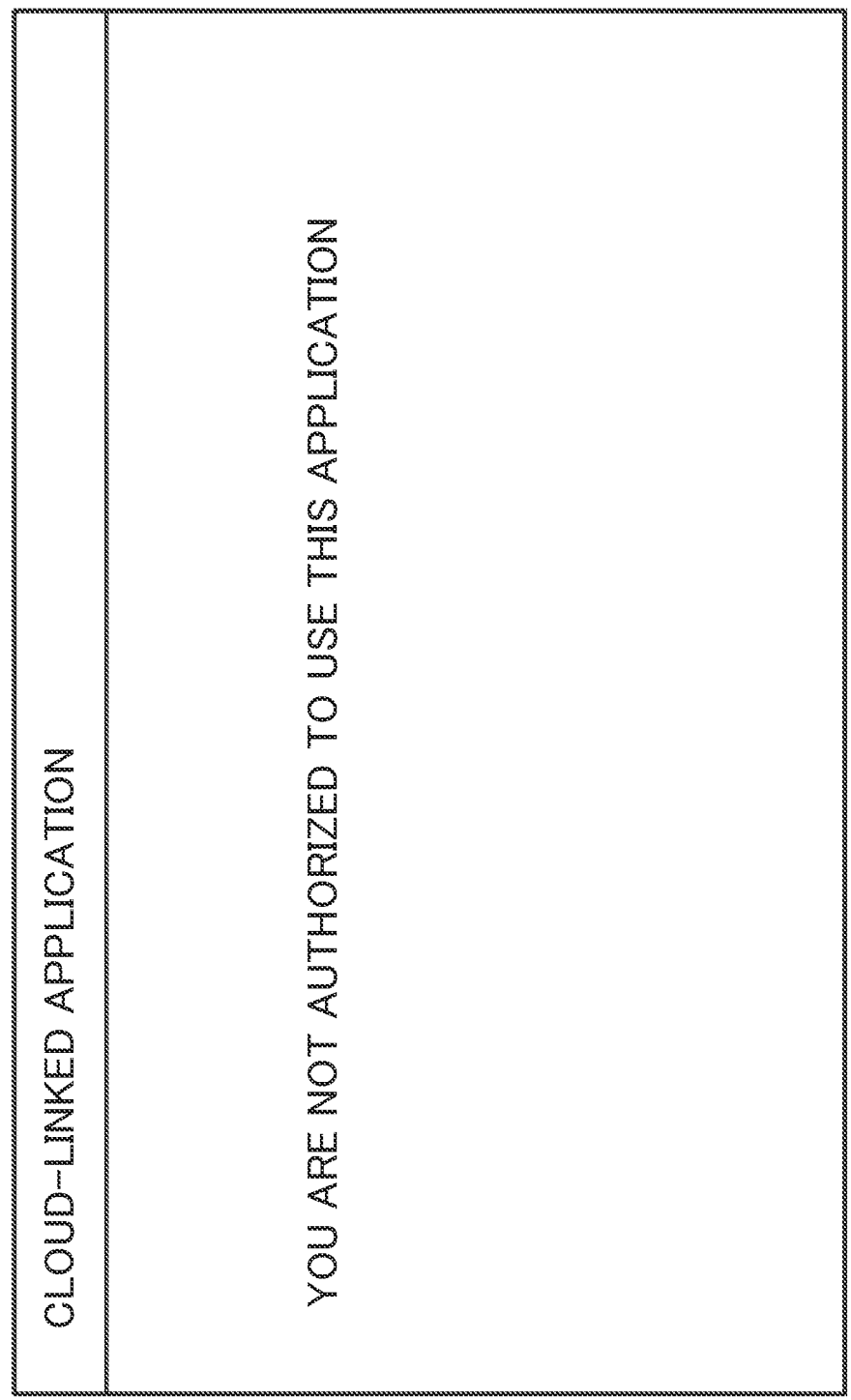
FIG. 14 is a schematic drawing showing an example of an application restriction screen, displayed by the operation shown in FIG. 12.

FIG. 14 illustrates an example of the application restriction screen 80.

The application restriction screen 80 shown in FIG. 14 represents the screen for restricting the use of the cloud-linked application.

In the image forming apparatus 20, as described above, the normal application device itself decides whether the user who has logged in in the image forming apparatus 20 is authorized to utilize the normal application device (S186). Therefore, the user can utilize the normal application device that is accessible by this user, despite a program for realizing the function to identify the normal application device accessible by the user, with respect to each of the users, not being installed independent from the normal application program for realizing the normal application device.

Since the authentication system 30, which manages the information of the normal application device accessible by the user, with respect to each of the users, is provided for the image forming apparatus 20 outside thereof, the image forming apparatus 20 is exempted from securing the storage capacity for managing the information of the normal application device accessible by the user with respect to each of the users, which leads to improved convenience of use of the image forming apparatus 20.

In the case of the electronic device according to the Background Art, for example, the function to identify the application accessible by the user, with respect to each of the users, is realized by the program independent from the application program for realizing the application. Therefore, the electronic device, in which such independent program is not installed, is unable to decide whether the application is accessible by a specific user.

With the configuration according to the foregoing embodiment, in contrast, the user can utilize the application that is accessible by the user, despite the program for realizing the function to identify the application accessible by the user, with respect to each of the users, not being installed independent from the application program for realizing the application.

In the authentication system 30, as described above, the user information database 34b including the accessible application information is stored in the storage device 34, as shown in FIG. 6. Alternatively, the authentication system 30 may store a user information database 34c without the accessible application information (see FIG. 15), and a group information database 34d including information of groups to which the users of the image forming apparatus belong (see FIG. 16), in the storage device 34, in place of the user information database 34b shown in FIG. 6.

Figure 15:
FIG. 15 is a schematic drawing showing an example of a user information database, stored in the image forming apparatus shown in FIG. 2.

FIG. 15 illustrates an example of the user information database 34c.

As shown in FIG. 15, the user information database 34c includes the user ID, the password of the user, the user name, and the name of the group to which the user belongs, with respect to each of the users.

Figure 16:
FIG. 16 is a schematic drawing showing an example of a group information database, stored in the image forming apparatus shown in FIG. 2.

FIG. 16 illustrates an example of the group information database 34d.

As shown in FIG. 16, the group information database 34d includes the group name and the accessible application information, with respect to each of the groups.

The authentication execution device 35a can identify the accessible application information for the user who has been successfully authenticated, by identifying the name of the group to which the user who has been successfully authenticated belongs, on the basis of the user information database 34c, and then identifying the accessible application information associated with the identified group name in the group information database 34d.

Second Embodiment

First, a configuration of an information processing system according to this embodiment will be described hereunder.

The configuration of the information processing system according to this embodiment is similar to that of the information processing system 10 according to the first embodiment (see FIG. 1), except for the following aspects. The elements of the information processing system according to this embodiment that are same as or similar to those of the information processing system 10 are given the same numeral, and detailed description of such elements may be skipped.

The information processing system according to this embodiment includes an image forming apparatus 220 (see FIG. 17) exemplifying the electronic device, as substitution for the image forming apparatus 20 (see FIG. 2). The information processing system according to this embodiment may include one or more image forming apparatuses, configured similarly to the image forming apparatus 220, in addition thereto. The image forming apparatus 220 is, for example, constituted as an MFP, or a single-function printer.

Figure 17:
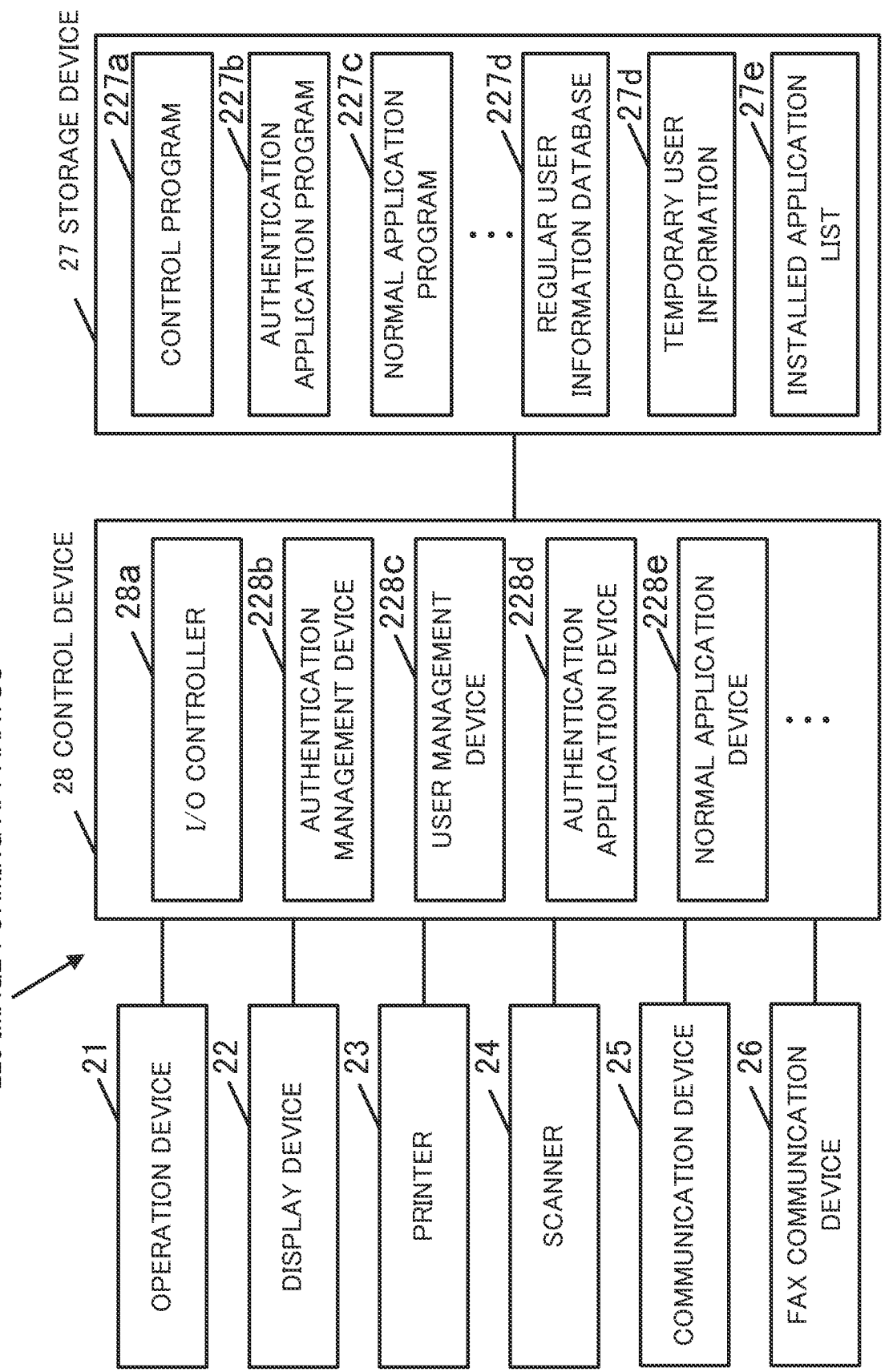
FIG. 17 is a block diagram showing a configuration of an image forming apparatus constituted as an MFP, in an information processing system according to a second embodiment of the disclosure.

FIG. 17 is a block diagram showing the configuration of the image forming apparatus 220, constituted as the MFP.

As shown in FIG. 17, the storage device 27 of the image forming apparatus 220 contains a control program 227a for controlling the image forming apparatus 220, in place of the control program 27a (see FIG. 2).

The storage device 27 of the image forming apparatus 220 contains an authentication application program 227b for realizing an authentication application device 228d for controlling the authentication of the user, in place of the authentication application program 27b (see FIG. 2).

The storage device 27 of the image forming apparatus 220 can contain a normal application program 227c, for realizing a normal application device different from the authentication application device 228d, in place of the normal application program 27c (see FIG. 2). Likewise, the storage device 27 of the image forming apparatus 220 can contain one or more normal application programs, in addition to the normal application program 227c.

The storage device 27 contains a regular user information database 227d, including information of the users who regularly use the image forming apparatus 220 (hereinafter, "regular user").

Figure 18:
FIG. 18 is a schematic drawing showing an example of the normal user information database shown in FIG. 17.

FIG. 18 illustrates an example of the regular user information database 227d.

As shown in FIG. 18, the regular user information database 227d includes the user ID, the password of the user, the user name, and the accessible application information related to the user, with respect to each of the users.

The control device 28 shown in FIG. 17 realizes, by executing the control program 227a stored in the storage device 27, the I/O controller 28a that controls inputs through the operation device 21 and outputs to the display device 22, the authentication management device 228b that manages the authentication of the user, and the user management device 228c that manages the users. The user management device 228c can update the regular user information database 227d, for example according to an instruction received through the operation device 21 or the communication device 25.

The control device 28 realizes the authentication application device 228d, by executing the authentication application program 227b stored in the storage device 27. For example, the control device 28 acts as the authentication application device 228d, when the processor in the control device 28 executes the authentication application program 227b stored in the storage device 27.

The control device 28 realizes the normal application device, by executing the normal application program stored in the storage device 27. For example, the control device 28 acts as the normal application device 228e, when the processor in the control device 28 executes the normal application program 227c stored in the storage device 27.

Hereunder, the operation of the information processing system according to this embodiment will be described.

First, the operation performed by the image forming apparatus 220 when the user logs in therein will be described.

Figure 19:
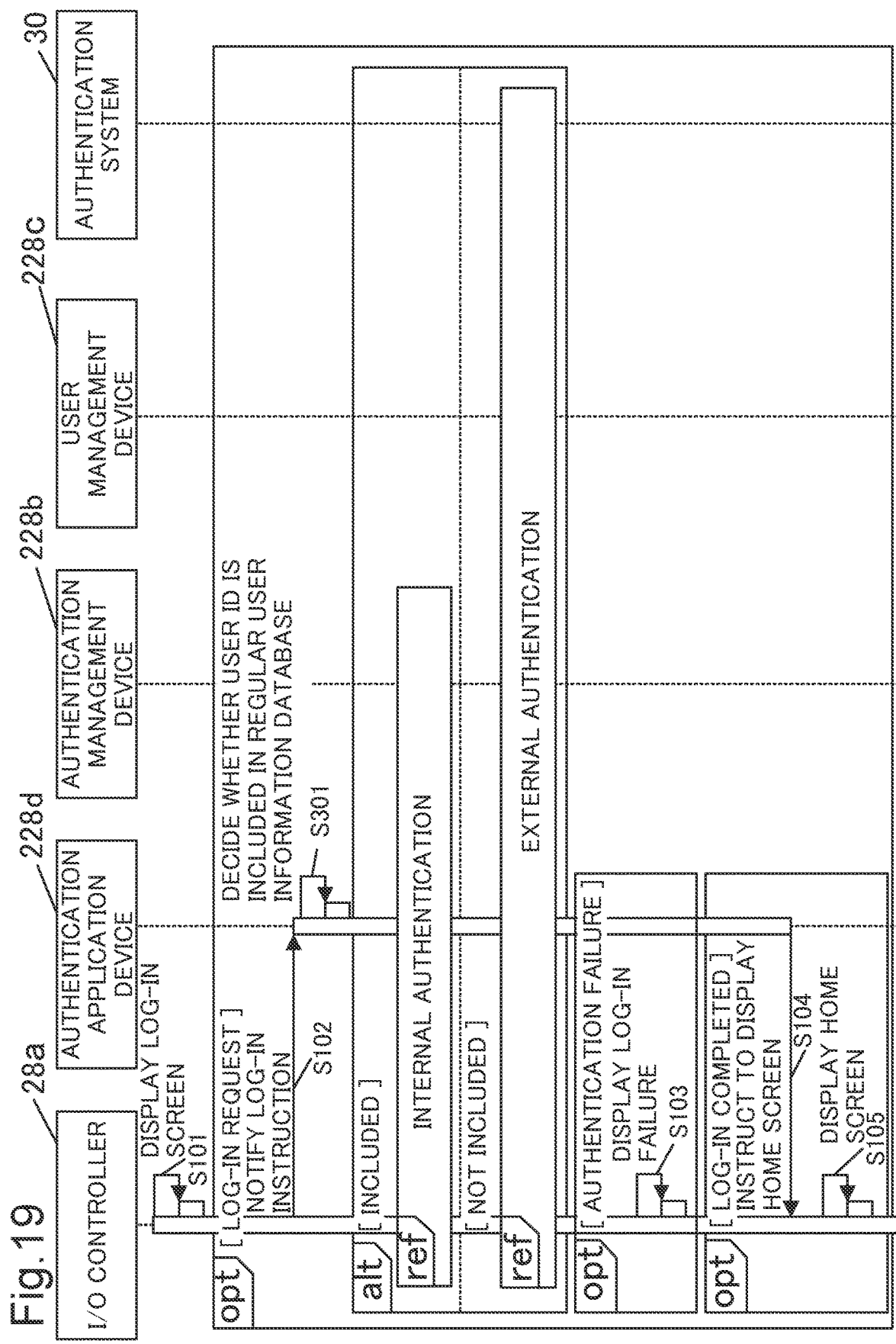
FIG. 19 is a sequence diagram showing an operation performed by the image forming apparatus shown in FIG. 17, when a user logs in in the image forming apparatus.
Figure 20:
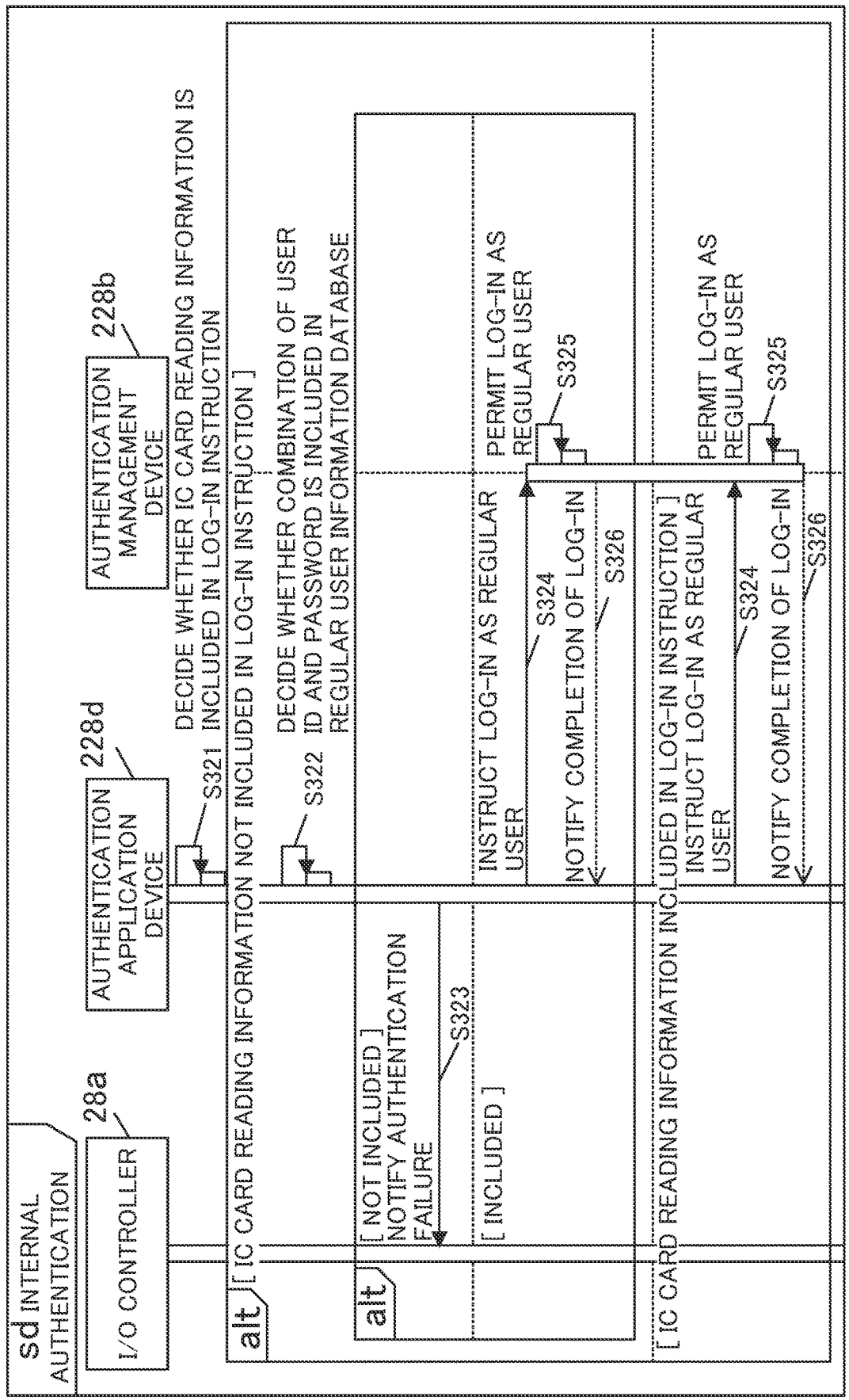
FIG. 20 is a sequence diagram showing a process of the internal authentication shown in FIG. 19.

FIG. 19 is a sequence diagram showing the operation performed by the image forming apparatus 220, when the user logs in therein. FIG. 20 is a sequence diagram showing a process of the internal authentication shown in FIG. 19.

As shown in FIG. 19 and FIG. 20, the I/O controller 28a performs the operation of S101 and S102, in the same way as the first embodiment.

Upon receipt of the log-in instruction from the I/O controller 28a at S102, the authentication application device 228*d* decides whether the user ID included in the log-in instruction is stored in the regular user information database 227*d* (S301).

Upon deciding at S301 that the user ID included in the log-in instruction is stored in the regular user information database 227*d*, the authentication application device 228*d* decides whether the IC card reading information is included in the log-in instruction (S321).

Upon deciding at S321 that the IC card reading information is not included in the log-in instruction, the authentication application device 228*d* decides whether the combination of the user ID and the password included in the log-in instruction is included in the regular user information database 227*d* (S322).

Upon deciding at S322 that the combination of the user ID and the password included in the log-in instruction is not included in the regular user information database 227*d*, the authentication application device 228*d* notifies the failure in user authentication to the I/O controller 28*a* (S323).

When the failure in user authentication is notified from the authentication application device 228*d* at S323, the I/O controller 28*a* displays the failure in logging in in the image forming apparatus 220, on the display device 22 (S103).

When the authentication application device 228*d* decides at S321 that the IC card reading information is included in the log-in instruction, or decides at S322 that the combination of the user ID and the password included in the log-in instruction is included in the regular user information database 227*d*, in other words decides that the user authentication has resulted successful, the authentication application device 228*d* instructs the authentication management device 228*b* to permit the log-in as regular user (S324).

Upon receipt of the instruction of S324, the authentication management device 228*b* lets the user relevant to the instruction of S324 log in in the image forming apparatus 220 as regular user (S325), and notifies the authentication application device 228*d* that the log-in has been completed (S326).

When the authentication application device 228*d* decides at S301 that the user ID included in the log-in instruction is not stored in the regular user information database 227*d*, the information processing system according to this embodiment performs, as in the first embodiment, the external authentication process shown in FIG. 8.

When the failure in user authentication is notified from the authentication application device 228*d* at S146, the I/O controller 28*a* displays the failure in logging in in the image forming apparatus 220, on the display device 22 (S103).

When the completion of log-in is notified at S167 or S326, the authentication application device 228*d* instructs the I/O controller 28*a* to display the home screen 60 (see FIG. 11) (S104).

The I/O controller 28*a* displays the home screen 60 on the display device 22 (S105), according to the instruction received at S104.

The operation performed by the image forming apparatus 220, when activation of the normal application device is requested, will be described hereunder.

Figure 21:
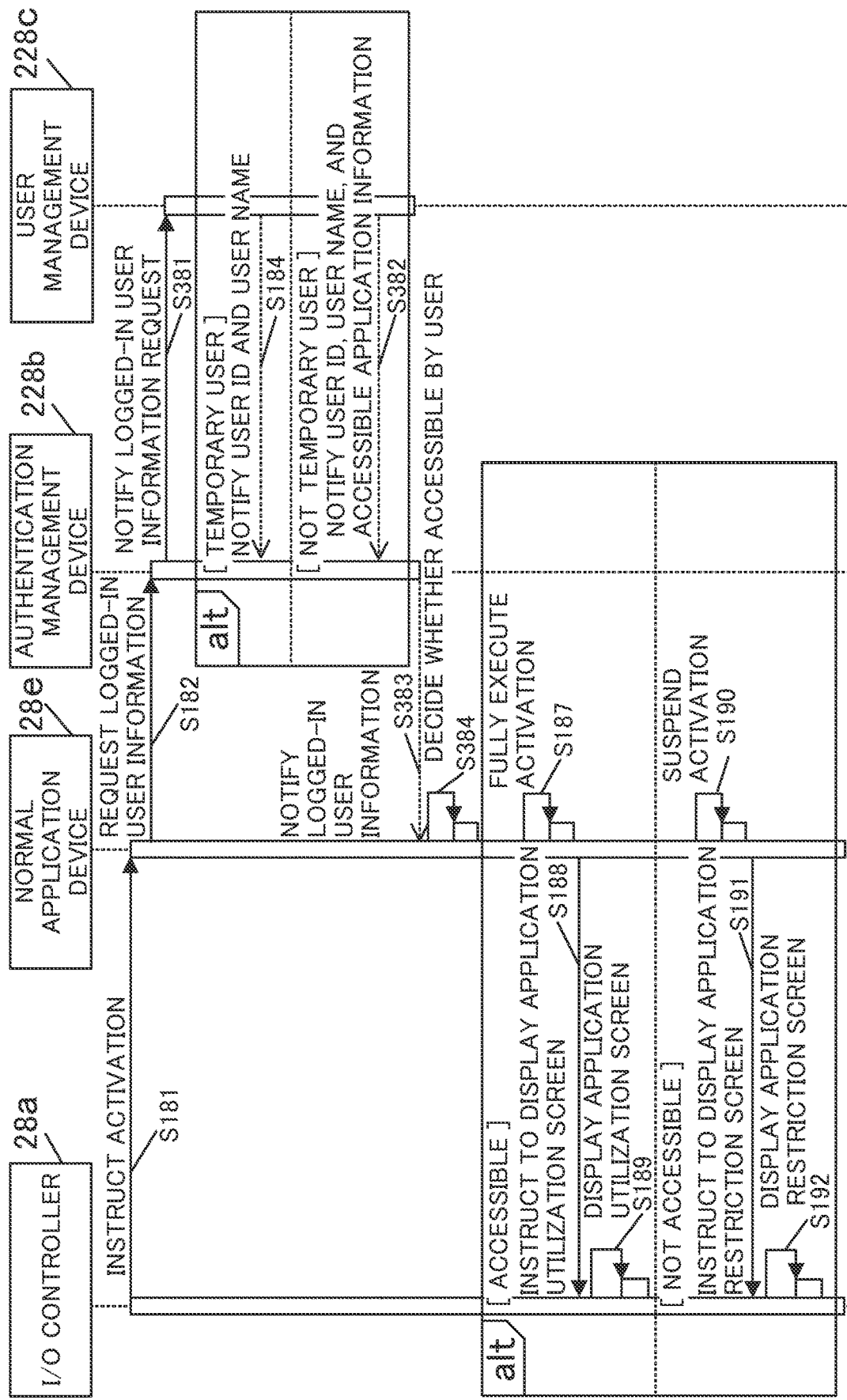
FIG. 21 is a sequence diagram showing an operation performed by the image forming apparatus shown in FIG. 17, when activation of the normal application is requested.

FIG. 21 is a sequence diagram showing the operation performed by the image forming apparatus 220, when activation of the normal application device is requested.

As shown in FIG. 21, upon detecting the normal application device activation request, the I/O controller 28*a* instructs the subject normal application device to activate itself (S181).

Upon receipt of the instruction of S181, the subject normal application device requests the authentication management device 228*b* to provide the information of the user who has logged in in the image forming apparatus 220 (S182). At this point, the authentication management device 228*b* is aware of the ID of this user, and whether this user is a temporary user, as information of the user who has logged in in the image forming apparatus 220.

Upon receipt of the request of S182, the authentication management device 228*b* notifies the request for the information of the user who has logged in in the image forming apparatus 220 (hereinafter, "logged-in user information request"), to the user management device 228*c* (S381). In this case, the authentication management device 228*b* includes the user ID of the user who has logged in in the image forming apparatus 220, and whether this user is a temporary user, in the logged-in user information request.

In the case where the logged-in user information request indicates that the user who has logged in in the image forming apparatus 220 is the temporary user, when the notice of S381 is received, the user management device 228*c* notifies the user ID included in the logged-in user information request, and the user name associated with this user ID in the temporary user information 27*d*, to the authentication management device 228*b* (S184).

In the case where the logged-in user information request indicates that the user who has logged in in the image forming apparatus 220 is not the temporary user, when the notice of S381 is received, the user management device 228*c* notifies the user ID included in the logged-in user information request, the user name associated with this user ID in the temporary user information 27*d*, and the accessible application information, to the authentication management device 228*b* (S382).

Upon receipt of the information of the user who has logged in in the image forming apparatus 220 at S184 or S382, the authentication management device 228*b* notifies the information received at S184 or S382, to the subject normal application device (S383).

Upon receipt of the notice of S383, the subject normal application device decides whether the user who has logged in in the image forming apparatus 220 is authorized to utilize the subject normal application device (S384). In the case where the notice of S383 includes the accessible application information, and when the accessible application information indicates the normal application corresponding to the subject normal application device itself, the subject normal application device decides at S384 that the user who has logged in in the image forming apparatus 220 is authorized to utilize the subject normal application device. Otherwise, in the case where the notice of S383 does not include the accessible application information, and when the application ID assigned to the normal application corresponding to the subject normal application device itself in the installed application list 27*e* is included in the user name included in the notice of S383, the subject normal application device decides at S384 that the user who has logged in in the image forming apparatus 220 is authorized to utilize the subject normal application device. On the other hand, in the case where the notice of S383 includes the accessible application information, and when the accessible application information does not indicate the normal application corresponding to the subject normal application device itself, the subject normal application device decides at S384 that the user who has logged in in the image forming apparatus 220 is not authorized to utilize the subject normal application device. Otherwise, in the case where the notice of S383 does not include the accessible application information, and when the application ID assigned to the normal application corresponding to the subject normal application device itself in the installed application list 27e is not included in the user name included in the notice of S383, the subject normal application device decides at S384 that the user who has logged in in the image forming apparatus 220 is not authorized to utilize the subject normal application device.

Upon deciding at S384 that the user who has logged in in the image forming apparatus 220 is authorized to utilize the subject normal application device, the subject normal application device completely executes the activation of the subject normal application device itself (S187), and instructs the I/O controller 28a to display the application utilization screen for the subject normal application device itself (S188).

The I/O controller 28a displays the application utilization screen on the display device 22 (S189), according to the instruction received at S188.

In contrast, upon deciding at S384 that the user who has logged in in the image forming apparatus 220 is not authorized to utilize the subject normal application device, the subject normal application device subject normal application device suspends the activation thereof (S190), and instructs the I/O controller 28a to display the application restriction screen for the subject normal application device itself (S191).

The I/O controller 28a displays the application restriction screen on the display device 22 (S192), according to the instruction received at S191.

In the image forming apparatus 220, as described thus far, the normal application device itself decides whether the user who has logged in in the image forming apparatus 220 is authorized to utilize the normal application device (S384). Therefore, the user can utilize the normal application device that is accessible by this user, despite a program for realizing the function to identify the normal application device accessible by the user, with respect to each of the users, not being installed independent from the normal application program for realizing the normal application device.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a printer that prints an image on a recording medium;
   a display device;
   an operation device; and
   a control device including a processor, and configured to act as:
      an authentication application device that controls authentication of a user, when the processor executes an authentication application program; and
      a normal application device, independent from the authentication application device, when the processor executes a normal application program,
   wherein the authentication application device
      executes user authentication, when the user logs into the image forming apparatus, and
      causes, when permitting the user to log into the image forming apparatus, the display device to display a screen including a first button for utilizing a print function originally installed in the image forming apparatus and a second button for utilizing the normal application device, which is a newly installed function,
   wherein the normal application device
      decides, upon detecting the second button being pressed through the operation device, whether the logged-in user is authorized to utilize the normal application device, on a basis of logged-in user information indicating the normal application device accessible by the logged-in user,
      upon deciding that the logged-in user is authorized to utilize the normal application device, executes the activation of the normal application device, and
      upon deciding that the logged-in user is not authorized to utilize the normal application device, does not execute the activation of the normal application device, and
   wherein the control device executes, upon detecting the first button being pressed through the operation device, a predetermined process for causing the printer to perform printing.

2. The image forming apparatus according to claim 1, wherein the normal application device uses the logged-in user information acquired from a user information management device provided outside of the image forming apparatus.

3. The image forming apparatus according to claim 1, further comprising a user information management device being a storage device that stores therein information indicating the normal application device accessible by the user, with respect to each of the users,
   wherein the normal application device uses the logged-in user information acquired from the user information management device.

* * * * *